United States Patent

Halstead

[15] 3,649,809

[45] Mar. 14, 1972

[54] SOLDERING AND DE-SOLDERING TIP FOR CONNECTOR PINS OF ELECTRICAL COMPONENTS

[72] Inventor: William Meredith Halstead, P.O. Box 195, Linthicum Heights, Md. 21090

[22] Filed: Apr. 19, 1971

[21] Appl. No.: 135,378

Related U.S. Application Data

[63] Continuation of Ser. No. 835,924, June 24, 1969, abandoned.

[52] U.S. Cl. ............................219/228, 29/203 B, 219/239, 228/19, 228/51

[51] Int. Cl. ............................B23k 3/02, H05b 1/00

[58] Field of Search ............................219/221, 227–241; 228/51–55, 19; 29/203 H, 203 R, 203 B

[56] References Cited

UNITED STATES PATENTS

| | | | |
|---|---|---|---|
| 2,116,562 | 5/1938 | Cruser | 219/229 |
| 3,003,049 | 10/1961 | Thomas | 228/53 |
| 3,050,612 | 8/1962 | Eversole | 219/233 |
| 3,084,649 | 4/1963 | Parstorfer | 219/233 |
| 3,130,286 | 4/1964 | Lenzi | 219/233 |
| 3,529,760 | 9/1970 | Hickman et al. | 219/229 X |

FOREIGN PATENTS OR APPLICATIONS

| | | | |
|---|---|---|---|
| 1,338,103 | 8/1963 | France | 219/228 |
| 1,564,832 | 3/1969 | France | 219/228 |
| 463,162 | 3/1937 | Great Britain | 228/52 |

OTHER PUBLICATIONS

" Soldering Iron Tip" ; W. J. Richardson; IBM Technical Disclosure Bulletin; Aug. 1958; Vol. 1, No. 2; page 18.

*Primary Examiner*—A. Bartis
*Attorney*—Munson H. Lane

[57] ABSTRACT

A supporting shank attachable to a soldering iron and provided at its end with a pair of elongated tip bodies disposed in spaced parallel relation and extending transversely of the shank. The tip bodies are each provided with a longitudinally extending continuous groove for reception of a row of connector pins of an electrical component. The grooves are each of a depth less than the distance which the connector pins project from the underside of the printed circuit board on which the component is mounted and are of such width as to retain a quantity of solder in a molten state by capillary action when the tip is heated, so that all the connector pins may be simultaneously soldered to or de-soldered from the printed circuit board. End portions of the tip bodies are pointed and wedge-shaped so that they may be used for straightening bent over connector pins by prying the latter away from the board.

5 Claims, 4 Drawing Figures

INVENTOR
WILLIAM M. HALSTEAD

BY Munson H. Lane
ATTORNEYS

SOLDERING AND DE-SOLDERING TIP FOR CONNECTOR PINS OF ELECTRICAL COMPONENTS

The present application is a continuation of my earlier application, Ser. No. 835,924, filed June 24, 1969, now abandoned.

This invention relates to new and useful improvements in tips for soldering irons, and in particular the invention concerns itself with a tip which is especially constructed to facilitate expeditious soldering and desoldering of connector pins or terminals of molded integrated circuit components while such components are being applied to or removed from a printed circuit board.

As is well known, electrical components of this type have several connector pins, as many as 16 or 24, usually arranged in two parallel rows, and individual soldering of such pins, one after another, is a tedious procedure. Moreover, individual desoldering of the pins for removal of the component is not practical inasmuch as the solder sets quickly and therefore does not remain in a molten state long enough for all the pins to be desoldered.

It is, therefore, the principal object of the invention to provide an improved tip which may be quickly and easily employed for soldering or desoldering all the connector pins of an electrical component simultaneously, so that the component may be expeditiously applied to or removed from a printed circuit board.

As such, the invention provides a soldering tip which consists of a pair of spaced parallel, elongated tip bodies carried by a bifurcated end portion of a supporting shank which is attachable to a conventional soldering iron. The tip bodies are formed with continuous longitudinal grooves for simultaneously receiving two rows of connector pins, and the grooves contain solder in a molten state when the tip is heated, so that simultaneous soldering or desoldering of all the pins may be effected in a simple, convenient and expeditious manner.

Another feature of the invention resides in that the end portions of the elongated tip bodies are pointed wedge-shaped so that they may be used for straightening connector pins which have been bent over.

The tip of the invention is simple in construction, efficient in operation, and lends itself to economical manufacture.

With the foregoing more important object and features in view and such other objects and features which may become apparent as this specification proceeds, the invention will be understood from the following description taken in conjunction with the accompanying drawings, wherein like characters of reference are used to designate like parts, and wherein.

Figures 1, 2, 3, 4:
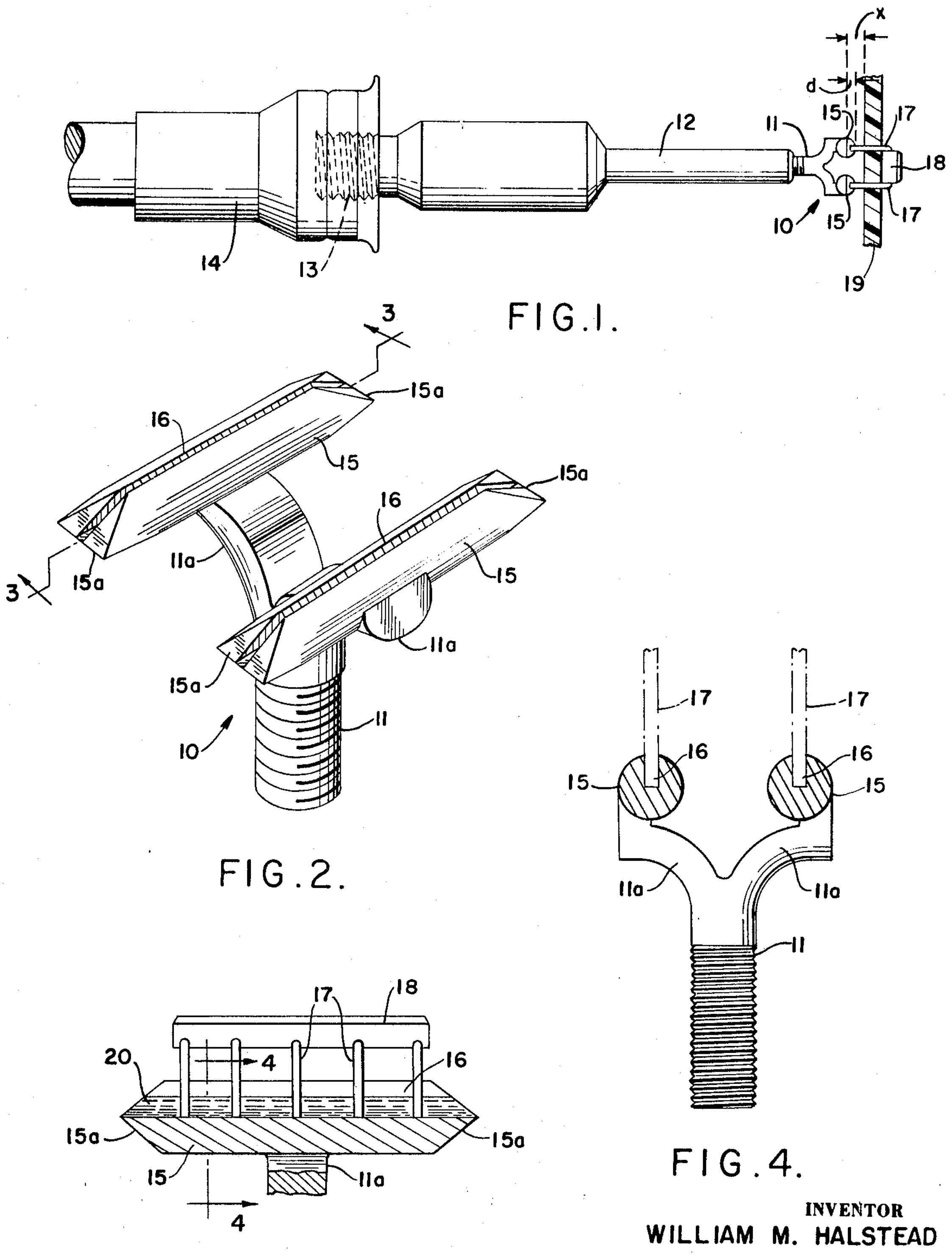
FIG. 1 is an elevational view showing the tip of the invention attached to a soldering iron and applied to the work.
FIG. 2 is an enlarged perspective view of the tip per se.
FIG. 3 is a fragmentary sectional view, taken substantially in the plane of the line 3—3 in FIG. 2 and also showing the connecting pins of a component in the groove of the tip body.
FIG. 4 is a sectional view, taken substantially in the plane of the line 4—4 in FIG. 3.

Referring now to the accompanying drawings in detail, the soldering and desoldering tip of the invention is designated generally by the reference numeral 10. The same comprises a supporting shank 11 which is removably screw-threaded into the outer end portion of a conventional shank extension 12 which in turn is removably screw-threaded as at 13 into a conventional hand-held soldering iron 14, the structure of the extension 12 and iron 14 being well known in the art so that a detailed description thereof is unnecessary.

The shank 11 is bifurcated to provide a pair of furcations **11*a*, 11*a*, each carrying an elongated tip body 15 which is preferably circular in cross section as shown in FIG. 4. The two tip bodies 15, 15 are disposed in spaced parallel relation and extend transversely of the longitudinal axis of the shank 11, or in other words, the two tip bodies are disposed in a common plane which is normal to the shank axis. Thus, the tip bodies present outwardly oriented longitudinal side portions for engaging the work, and these side portions of the tip bodies are provided with longitudinally extending grooves 16 for receiving two rows of connector pins 17 of a molded integrated circuit component or some other similar electrical component indicated at 18, which is to be applied to or removed from a printed circuit board 19, as shown in FIG. 1. As shown the grooves 16** are continuous and open-ended and are relatively shallow as compared with their length.

The grooves 16, which are outwardly open and also have open ends, contain a quantity of solder 20, the latter being in a molten state when the tip 10 is heated by the soldering iron 14.

The solder 20 in its molten state is retained in the grooves 16 by capillary action and when the device is used for installation of the component 18 on the printed circuit board 19, it is applied to the work so that the connector pins 17, projecting through the board, are received in the solder-filled grooves 16 and molten solder is thus simultaneously bonding them to the printed circuit board. Similarly, when the component is to be removed, the device is applied to the connector pins in a like manner so that all the pins are simultaneously desoldered and expeditious removal of the component is facilitated while the solder on all the pins is in a molten state.

In some instances the connector pins of an installed component are bent over against the printed circuit board, and it is necessary to straighten such bent over pins before they may be desoldered and the component removed. For this purpose, the end portions of the tip bodies 15 are preferably double bevelled to form pointed wedges **15*a*** as is best shown in FIG. 3. These wedge-shaped end portions of the tip bodies may be inserted between the bent over connector pins and the printed circuit board for prying the pins away from the board and thus straightening the pins preparatory to subsequent desoldering and removal of the component.

It may be noted that inasmuch as most integrated circuit components have their connector pins arranged in two rows, the tip of the invention provides two parallel tip bodies (15) to accommodate the two rows of pins respectively. However, only a single tip body may be provided if the component has only one row of pins, or more than two tip bodies may be provided if the component has more than two rows of pins. In any event, the tip bodies are sufficiently long so that in a preferred embodiment of the invention, they may accommodate all the pins in a row at the same time.

As will be noted the grooves 16 are relatively shallow being of a depth *d* (FIG. 1) which is less than the distance *x* which the connector pins 17 project through the printed circuit board 19 to which the electrical component 18 is to be applied or from which said component is to be removed. Also where two or more rows of connector pins 17 are involved and the tip 10 includes two or more tip bodies 15,15 the distance between grooves 16,16 must be equal to the distance between rows of pins 17.

What is claimed is:

1. A soldering and desoldering tip for use in soldering and desoldering rows of connector pins of an electrical component from a circuit board upon which the component is mounted on one side of the board with the pins extending through rows of apertures in the board and projecting a substantial distance on the opposite side of the board, said tip comprising a supporting shank, means on one end of said shank for detachably connecting said shank to a heating source, at least one elongated tip body provided at the opposite end of said shank from said one end and extending transversely thereof, said tip body having a single outwardly oriented work engaging longitudinal portion including continuous uninterrupted fixed side walls providing a single continuous longitudinally extended groove which is open outwardly for reception of a row of connector pins, said groove being of such width that a quantity of solder in a molten state may be retained therein by capillary action when the tip is heated, said groove being of a depth which is less than the distance which the connector pins project from the underside of the circuit board.

2. The device as defined in claim 1 which is further characterized in that said elongated tip body is of a substantially circular cross section.

3. The device as defined in claim 1 wherein at least one end portion of said elongated tip body is pointed, wedge-shaped and constitutes means for straightening bent-over connector pins.

4. The device as defined in claim 1 wherein said tip also includes a second elongated tip body extending transversely of the shank in spaced parallel relation to the first mentioned tip body, said second tip body including a second groove identical to the first and spaced therefrom a distance equal to the distance between two rows of connector pins.

5. The device as defined in claim 4 wherein said shank includes a bifurcated end portion carrying the respective first and second tip bodies on the furcations thereof.

* * * * *